Patented May 11, 1926.

1,584,123

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

EXTRACTING OIL FROM MILK.

No Drawing.  Application filed March 2, 1923. Serial No. 622,460.

The invention which forms the subject of this application for Letters Patent is an improved and novel process of extracting oil in a pure and hence imperishable condition from milk. In its natural state milk comprises very minute fat particles in emulsion with water and milk solids, not fat, and it is a serious problem to extract the fat entirely free from all such non-fat solids, the presence of which in the fat, even in minute quantities, impairs its odor, flavor and keeping qualities. There are now several processes known by which this may be accomplished, but I shall herein describe and claim a new and different process, which involves some of the steps formerly practiced, but in somewhat modified form and in addition filtration. The following prefatory considerations will conduce to a better understanding of this novel process.

It is known that the breaking of the emulsion which we know as milk, may be accomplished and the coalescence of the fat globules brought about by the use of heat aided by gravity. The heating of milk or cream to temperatures above 96° F., which is the melting point of the fat, maintains these globules in a liquid form, the emulsion then consisting of minute drops of liquid oil floating or suspended in the milk serum. When in such condition the fat globules more readily coalesce, and if left to the action of gravity, because they are lighter than the milk serum, they gradually come closer together as they approach the surface until actual contact occurs and coalescence is more or less complete. This coalescence is accelerated the more completely liquefied the fat and this results from higher temperatures than that named.

Heat has also an effect upon the milk serum itself reducing its viscosity by expanding its volume and increasing fluidity. This decreases the friction between the surface of the fat globules and the serum so that the resistance to the latter's upward motion under the influence of gravity is diminished. Generally speaking, the heating of the serum promotes the rising of the fat to the surface.

Another result of heat upon the milk serum is its effect upon the casein which is normally suspended in it in colloidal form. Continued heat tends to coagulate or clot this casein so that it is ultimately changed from its colloidal or semi-solid into entirely solid flakes or masses. The effect of heat is progressive both on the coalescence of the fat and on the coagulation of the casein hence the time factor becomes of great importance in bringing about a completion of these processes, and this depends upon other subsidiary factors each of which affects the rate of the processes to some degree. Such factors are acidity, agitation, freezing, dilution with water, the percentage of solids not fat and the temperature used.

For example, increased acidity promotes the coagulation of the casein without effect upon the fat. Agitation, if previously applied to the fat at lower temperatures, promotes coalescence. Freezing promotes the breaking of the emulsion. Dilution with water greatly facilitates the rising of the fat to the surface, while higher temperature promotes the rising and coalescence of the fat and the coagulation of the casein.

In the heating of natural milk or cream the presence of the solids, not fat, is the most serious obstacle to the complete and successful fat separation. While the coalescence of fat globules and the accumulation of fat on the surface of a vessel containing heated milk has been observed in the past, still the presence of the solids, not fat, and particularly the casein, has prevented any successful separation of a pure fat when such heating is applied as a preliminary step. Incidentally, the coagulation of the casein by the heat actually militates against the complete rising of the fat to the surface, while in addition to this, the rising of the fat as a whole is so slow that its recovery within the limits of commercial success requires too many hours of standing for each heated vessel to be practicable.

On the other hand, if the solids, not fat, are first eliminated, and this may be done by washing the milk or cream and substituting pure water for the skim milk, then the fat emulsion responds much more readily to the application of heat and the time of recovery is brought within the limits of practical commercial success. This washing out of the solids, not fat, may be accomplished by first separating out the cream as far as practicable from the skim milk then diluting the cream with pure water and separating it out again by the use of a centrifugal cream separator and by repeating this step until the percentage of the skim milk originally present with the cream is very small. The product is aptly known as "washed" cream.

If such washed cream be then diluted with water and heated the separation of the fat is very greatly facilitated. The almost complete absence of skim milk and the presence of a large volume of water reduces the viscosity and hence the friction of the serum on the fat globules to such an extent that all sizes of the latter, even to the smallest, rise freely to the surface and coalesce in a comparatively short time. At the same time, the comparative absence of casein results in the presence of only a limited amount of casein flakes, too few to offer any resistance to the gathering of the fat, but generally too numerous in and about the fat to permit the latter to be classed as pure and imperishable.

This casein, which it will be observed is in flakes due to its coagulation by heat, may then be removed at a sufficiently high temperature to maintain it in such condition by filtering the oil containing it after the latter has been freed from as much of the water as is practicable, using for this purpose any suitable oil filter. For this purpose, after the oil has risen to the surface of the vessel in which it was heated and allowed to stand, the water beneath the supernatant layer of oil is drawn off as far as possible and the oil with such water as remains then passed through the filter. This removes all of the coagulated casein leaving a clear oil mixed with water. The latter may then be removed by any of the processes commonly used for the drying of an oil, such as by the use of a drying or condensing apparatus or a centrifuge such as an oil separator.

I now give a specific example of the manner in which my new process is or may be carried out. I first separate from whole milk containing 3½% fat and by any suitable and known process cream having a fat percentage of 35. This cream is then washed, as by dilution with water in the ratio of 10 to 1 and passage through a centrifuge, and this washing is repeated at least three times with the result that less than one tenth of 1% of the original skim milk remains.

To the washed cream is then added ten times its volume of pure water and the dilution heated to a temperature above the melting point of the fat but preferably to about 130° F. and allowed to stand with this temperature maintained for about two hours. During this time, substantially all of the fat has risen to the surface in an oily layer. The water beneath this layer is then drawn off and the hot fat and such water as remains is then passed through a filter composed of paper pulp or well made cotton or flannel or any other proper oil filter by which all traces of the coagulated casein are removed. The pure oil is then kept warm and passed through a centrifugal oil separator or freed of its remanent water in other known ways.

This is a highly economical and satisfactory process for extracting a pure anhydrous and imperishable oil from milk, the essentially novel features of which I have indicated in the claims.

What I claim is:—

1. The process of securing oil from milk which consists in separating the cream from the skim milk, washing the cream, diluting the washed cream with water, maintaining the dilution at a temperature and for a time sufficient to break the emulsion, coagulating the remaining casein, and permit the oil to rise to the surface, then filtering the hot supernatant layer of oil, and finally drying the same or freeing it from moisture.

2. The steps in the process herein set forth of securing oil from milk which consist in heating a dilution of washed cream to break the emulsion and coagulate the casein, and then filtering the oil to remove the coagulated casein.

3. The steps in the process herein set forth of securing oil from milk which consist in heating a dilution of washed cream, holding the fluid for a sufficient length of time at a sufficient temperature to break the emulsion and coagulate the casein, and then separating the coagulated casein from the oil by filtration.

In testimony whereof I hereto affix my signature.

CHARLES E. NORTH.